(12) United States Patent
Kim

(10) Patent No.: US 9,304,345 B2
(45) Date of Patent: Apr. 5, 2016

(54) LIQUID CRYSTAL DISPLAY DEVICE

(71) Applicant: LG Display Co., Ltd., Seoul (KR)

(72) Inventor: Kyoung-Jae Kim, Gyeongsangbuk-do (KR)

(73) Assignee: LG DISPLAY CO., LTD., Seoul (KR)

( * ) Notice: Subject to any disclaimer, the term of this patent is extended or adjusted under 35 U.S.C. 154(b) by 22 days.

(21) Appl. No.: 14/537,678

(22) Filed: Nov. 10, 2014

(65) Prior Publication Data

US 2015/0168770 A1    Jun. 18, 2015

(30) Foreign Application Priority Data

Dec. 12, 2013    (KR) .......................... 10-2013-0154497

(51) Int. Cl.
- *G02F 1/1333*    (2006.01)
- *G02F 1/1335*    (2006.01)
- *F21V 8/00*    (2006.01)

(52) U.S. Cl.
CPC ........ *G02F 1/133308* (2013.01); *G02B 6/0073* (2013.01); *G02B 6/0093* (2013.01); *G02F 1/133512* (2013.01); *G02F 1/133615* (2013.01); *G02F 2001/133317* (2013.01)

(58) Field of Classification Search
CPC .......... G02F 2001/133317; G02F 2001/13332; G02F 1/133615; G02F 1/133512; G02B 6/0081; G02B 6/0093
See application file for complete search history.

(56) References Cited

U.S. PATENT DOCUMENTS

| | | | | |
|---|---|---|---|---|
| 2007/0132917 | A1* | 6/2007 | Kim ................. | G02F 1/133512 349/65 |
| 2009/0021679 | A1* | 1/2009 | Cheng ............... | G02F 1/133308 349/122 |
| 2009/0147174 | A1* | 6/2009 | Ha .................... | G02F 1/133606 349/58 |
| 2010/0045891 | A1* | 2/2010 | Oh ...................... | G02B 6/0088 349/58 |
| 2014/0240639 | A1* | 8/2014 | Jung ................ | G02F 1/133308 349/60 |

* cited by examiner

*Primary Examiner* — Mariceli Santiago
(74) *Attorney, Agent, or Firm* — Birch, Stewart, Kolasch & Birch, LLP

(57) ABSTRACT

An embodiment of the present invention provides a liquid crystal display device including: a backlight unit including a light guide plate under a liquid crystal panel and a light source at a first side of the light guide plate; a main frame surrounding the backlight unit and including a first guide wall and a first supporting portion, the first guide wall protruding from each corner of an upper surface of the main frame, and the supporting portion extending from adjacent two corners of the upper surface at the first side toward the backlight unit; a light-shielding tape attached on the upper surface of the main frame by being guided by the first guide wall and including a first chamfer portion at each corner and a protrusion at adjacent two corners at the first side, wherein the first chamfer portion and the protrusion correspond to the first guide wall and the first supporting portion, respectively; and a liquid crystal panel disposed over the backlight unit and attached on the light-shielding tape.

17 Claims, 7 Drawing Sheets

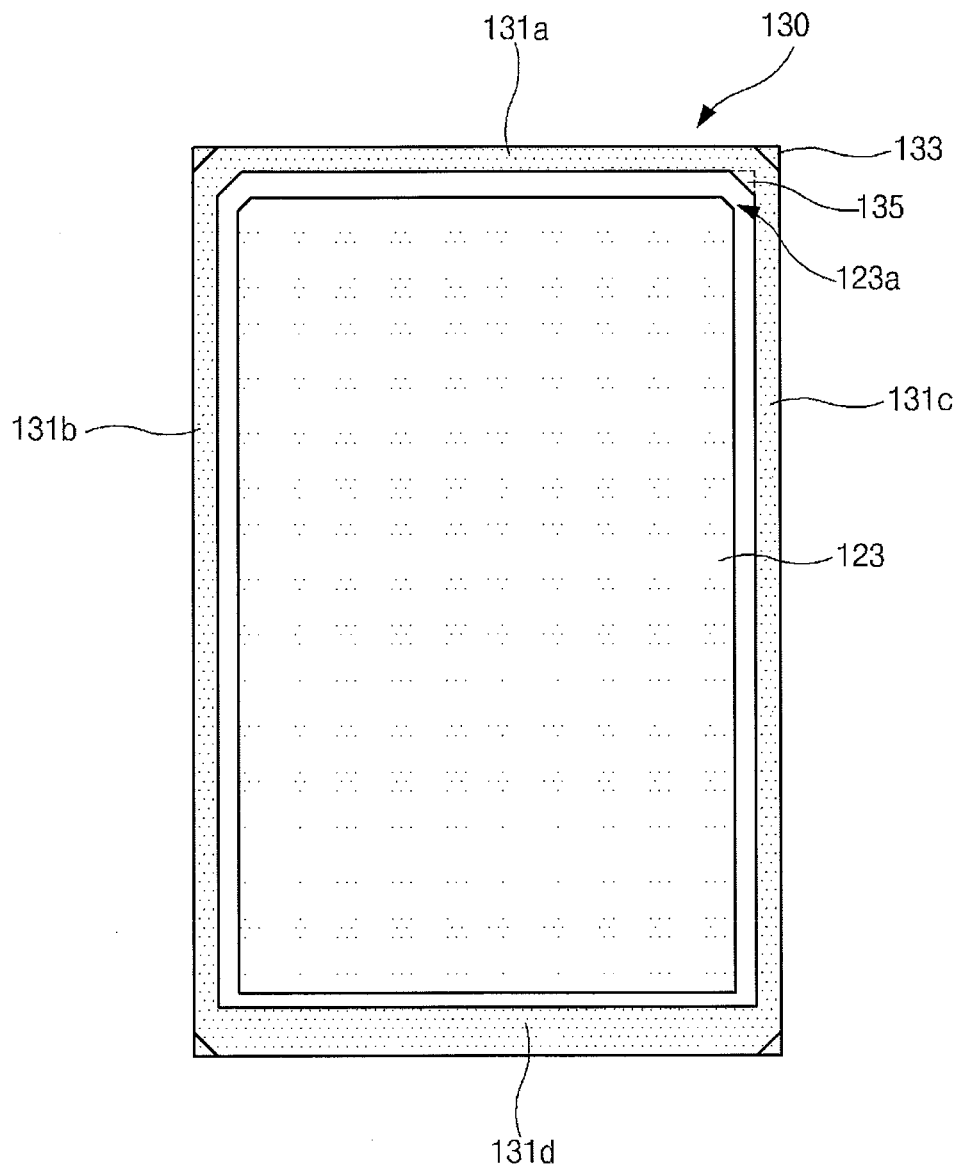

LIQUID CRYSTAL DISPLAY DEVICE

The present invention claims the benefit of Patent Application No. 10-2013-0154497 filed in the Republic of Korea on Dec. 12, 2013, which is hereby incorporated by reference.

BACKGROUND OF THE INVENTION

1. Field of the Invention

The invention relates to a liquid crystal display (LCD) device, and more particularly, to an LCD device including a light-shielding tape.

2. Discussion of the Related Art

The liquid crystal display (LCD) devices are widely used for notebook computers, monitors, TV, and so on, because of their high contrast ratio and capability to display moving images. The LCD devices use optical anisotropy and polarization properties of liquid crystal molecules to display images.

The LCD devices require a liquid crystal panel including first and second substrates and a liquid crystal layer interposed therebetween. An arrangement of the liquid crystal molecules in the liquid crystal layer is changed by an electric field induced in the liquid crystal panel to control light transmissivity.

Generally, an additional light source is required because the liquid crystal panel is a non-emissive-type display device. Accordingly, a backlight unit is disposed under the liquid crystal panel. The LCD device displays images using light produced by the backlight unit and supplied to the liquid crystal panel.

A cold cathode fluorescent lamp (CCFL), an external electrode fluorescent lamp and a light emitting diode (LED) can be used as a light source of the backlight unit. Among these light sources, the LEDs are widely used because of advantages in size, power consumption and reliability.

On the other hand, the backlight unit may be classified into a direct type and an edge type according to a position of the light source. In the edge type backlight unit, a light guide plate is disposed under a liquid crystal panel, and the light source is disposed at a side of the light guide plate. In the direct type backlight unit, the light source is disposed under the liquid crystal panel without the light guide panel.

The direct type backlight unit has an advantage in brightness, while the edge type backlight unit has advantages in weight and thickness.

FIG. 1 a cross-sectional view of the related art LCD device including the edge type backlight unit.

Referring to FIG. 1, the LCD device includes a liquid crystal panel 10, a backlight unit 20, a main frame 30, a bottom frame 50 and a top frame 40.

The liquid crystal panel 10 includes first and second substrates 12 and 14 facing each other and a liquid crystal layer (not shown) therebetween. First and second polarizing plates 19a and 19b for controlling the polarization direction of light, are respectively disposed at front and rear sides of the liquid crystal panel 10.

The backlight unit 20 is disposed at a rear side of the liquid crystal panel 10. The backlight unit 20 includes an LED assembly 29 arranged along a length direction of at least one edge of the main frame 30, a reflective sheet 25 of white or silver color on the bottom frame 50, a light guide plate 23 on the reflective sheet 25 and an optical sheet 21 on the light guide plate 23. The LED assembly 29 is positioned at one side of the light guide plate 23 and includes at least one LED 29a emitting white light and an LED printed circuit board (PCB) 29b where the LED 29a is disposed. The optical sheet 21 includes a plurality of sheets.

The LCD device further includes a light-shielding tape 60, i.e., a curtain tape, over an edge of the optical sheet 21. The light leakage in a non-display region is shielded by the light-shielding tape 60.

The liquid crystal panel 10 and the backlight unit 20 are combined using the main frame 30, which can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modularization.

Recently, the applications for LCD devices have become broader, and requirements of less weight, small size and larger display area are increased. Particularly, it is desirable to reduce a non-display area while increasing the display area. In other words, an LCD device with a narrower bezel is desired.

To meet these requirements, a thickness of the top cover 40, the bottom frame 50 and the main frame 30 needs to be reduced. However, when a thickness of the main frame 30, e.g., a horizontal length of the main frame 30 in FIG. 1, is reduced, there is not enough area on the main frame 30 for attaching the light-shielding tape 60. As a result, misalignment of the light-shielding tape 60 occurs.

When misalignment of the light-shielding tape 60 occurs, the light-shielding tape 60 is exposed beyond the main frame 30 or the display area of the liquid crystal panel 10 is shielded by the light-shielding tape 60. Additionally, a problem of light leaking at a boundary between the non-display area and the display area may occur. As a result, there are disadvantages in the brightness and the display quality.

SUMMARY OF THE INVENTION

Accordingly, embodiments of the invention are directed to an LCD device that substantially obviates one or more of the problems due to limitations and disadvantages of the related art.

An object of the invention is to provide an LCD device with a narrow bezel that is capable of preventing misalignment of a light-shielding tape.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the present invention can provide a liquid crystal display device including: a backlight unit including a light guide plate under a liquid crystal panel and a light source at a first side of the light guide plate; a main frame surrounding the backlight unit and including a first guide wall and a first supporting portion, the first guide wall protruding from each corner of an upper surface, and the supporting portion extending from adjacent two corners of the upper surface in the first side toward the backlight unit; a light-shielding tape attached on the upper surface of the main frame by being guided by the first guide wall and including a first chamfer portion at each corner and a protrusion at adjacent two corners in the first side, wherein the first chamfer portion and the protrusion correspond to the first guide wall and the first supporting portion, respectively; and a liquid crystal panel disposed over the backlight unit and attached on the light-shielding tape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings:

FIGS. 4A to 4C are views illustrating a modularization structure of a main frame, a light guide plate and a light-shielding tape according to an embodiment of the invention;

DETAILED DESCRIPTION OF EXEMPLARY EMBODIMENTS

Reference will now be made in detail to exemplary embodiments of the invention, which are illustrated in the accompanying drawings.

Figure 1:
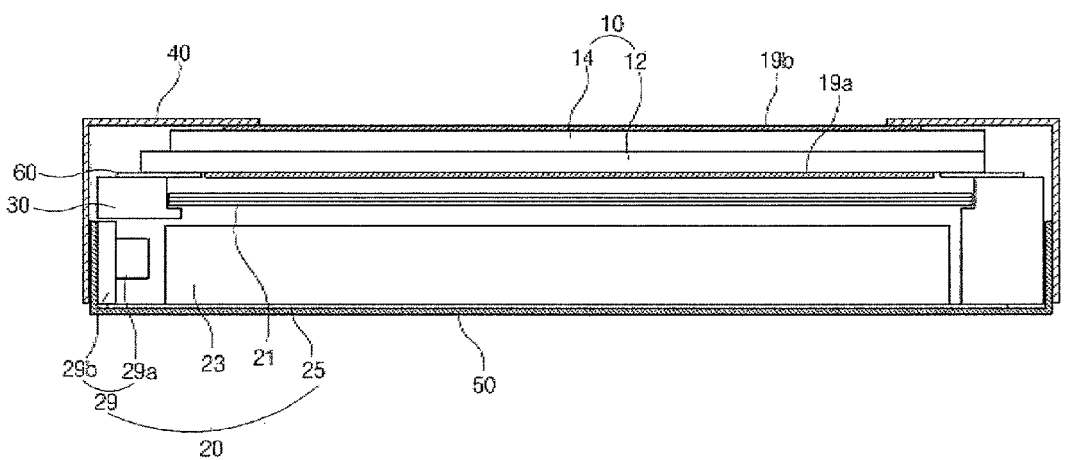
FIG. 1 a cross-sectional view of the related art LCD device including the edge type backlight unit.
Figure 2:
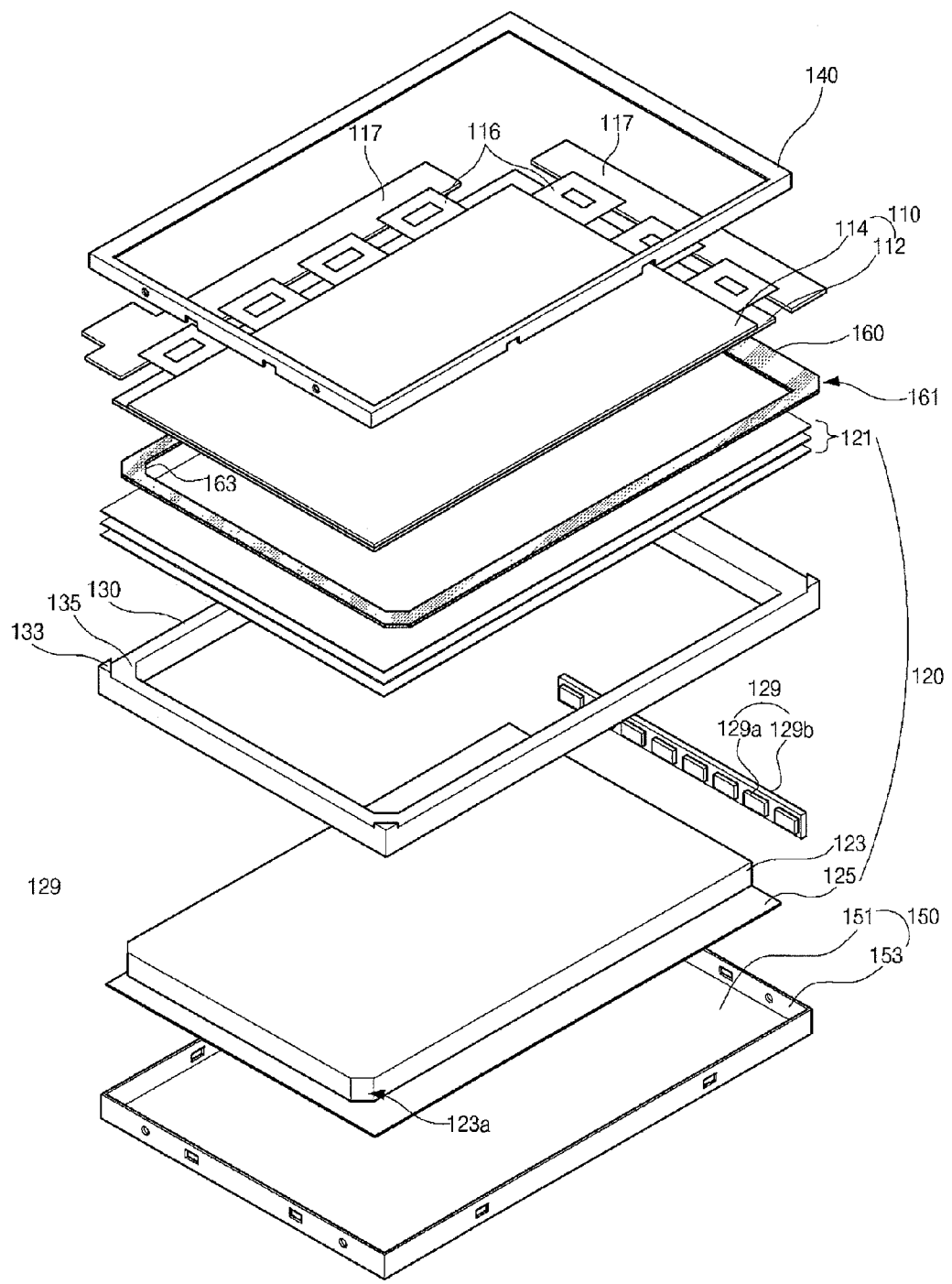
FIG. 2 is an exploded perspective view of an LCD device according to a first embodiment of the present invention.

FIG. 2 is an exploded perspective view of an LCD device according to a first embodiment of the present invention.

As shown in FIG. 2, an LCD device includes a liquid crystal panel 110, a backlight unit 120, a main frame 130, a bottom frame 150 and a top frame 140.

The backlight unit 120 is disposed under the liquid crystal panel 110, and the main frame 130 surrounds a side of each of the liquid crystal panel 110 and the backlight unit 120. The top frame 140 covers front edges of the liquid crystal panel 110, and the bottom frame 150 covers a rear side of the backlight unit 120. The main frame 130, the top frame 140 and the bottom frame 150 are combined for modularization.

The liquid crystal panel 110 includes first and second substrates 112 and 114 facing each other and a liquid crystal layer therebetween.

In an active matrix type, array elements, for example, a gate line (not shown), a data line (not shown), a thin film transistor (not shown) and a pixel electrode (not shown), are formed on the first substrate 112. The gate and data lines cross each other to define a pixel region, and the thin film transistor is formed at a crossing portion of the gate and data lines. The pixel electrode is disposed in the pixel region and connected to the thin film transistor.

In addition, a black matrix corresponding to the gate line, the data line and a thin film transistor that can block light, and a color filter layer having red, green and blue colors are formed on the second substrate 114. A common electrode is also formed on the second substrate 114 to generate an electric field with the pixel electrode on the first substrate 112. Moreover, first and second polarizing plates 119a and 119b (of FIG. 5), which can selectively transmit light, are positioned on outer sides of the first and second substrates 112 and 114.

Although not shown, first and second alignment layers for aligning an initial state of the liquid crystal molecules in the liquid crystal layer are formed on the first and second substrates 112 and 114, respectively. In addition, a seal pattern is formed at edges of the first and second substrates 112 and 114 for preventing leakage of the liquid crystal molecules.

The liquid crystal panel 110 is connected to a driving printed circuit board (PCB) 117 through a connection member 116 that provide a scanning signal and an image signal to the liquid crystal panel 110, respectively. The driving printed circuit board 117 extends along end portions of a bottom frame 150 of the backlight unit 120, respectively, as dummy spaces.

When the thin film transistor has an ON state by the scanning signal from a gate driving circuit, the image signal is applied to the pixel electrode through the data line to produce an electric field between the pixel electrode and the common electrode. As a result, as the intensity or direction of the electric field is changed, the alignment of the liquid crystal molecules in the liquid crystal layer also changes such that light transmissivity is controlled.

To display images using the controlled transmissivity, the backlight unit 120, which provides light to the liquid crystal panel 110, is disposed at a rear side of the liquid crystal panel 110.

The backlight unit 110 includes an LED assembly 129 as a light source, a reflective sheet 125 of white or silver color on the bottom frame 150, a light guide plate 123 on the reflective sheet 125 and an optical sheet 121 on or over the light guide plate 123.

The LED assembly 129 is positioned at one side of the light guide plate 123 and includes at least one LED 129a and a printed circuit board (PCB) 129b where the LED 29a is disposed. The optical sheet 121 includes a plurality of sheets.

The LEDs 129a emit red, green and blue color light. The LEDs 129a are simultaneously turned on and off such that white light can be provided from the LEDs 129a by a mixture of colors. Alternatively, to improve the optical efficiency and the brightness, a LED including a blue LED chip and a yellow fluorescent substance, e.g., cesium-doped yttrium-aluminum-garnet (YAG:Ce), may be used. The blue light from the blue LED chip is mixed with the yellow light from the yellow fluorescent substance such that the white light is provided.

The light emitted from the LED 129a is projected to the light guide plate 123 and refracted or reflected to be dispersed onto a wide region of the light guide plate 123. The light is processed into a plane light source.

To provide a uniform plane light source, the light guide plate 123 may include patterns on a rear side surface. For example, the pattern on the rear side surface of the light guide plate 123 is one of an elliptical pattern, a polygonal pattern and a hologram pattern. The patterns are formed on the rear side surface by a printing method or an injection molding method.

The reflective sheet 125 is disposed at a rear side of the light guide plate 123. The light passing through a rear side surface of the light guide plate 123 is reflected on the reflective sheet 125 such that light brightness provided into the liquid crystal panel 110 is improved.

The optical sheet 121 on or over the light guide plate 123 includes a diffusion sheet and at least one light-concentration sheet. The light passing through the light guide plate 123 is diffused and/or concentrated by the optical sheet 121 such that a uniform plane light source can be projected onto the liquid crystal panel 110.

The LCD device further includes a light-shielding tape 160 over an edge of the optical sheet 121 and between the optical sheet 121 and the liquid crystal panel 110. Thus, light leakage in a non-display region is blocked by the light-shielding tape 160.

The light-shielding tape 160 is attached on an upper portion of the main frame 130, and an edge of the liquid crystal panel 110 is attached to the light-shielding tape 160, which prevent movement of the liquid crystal panel 110. A guide wall 133 for guiding the light-shielding tape 160 is formed at each corner of the main frame 130. The guide wall 133 protrudes from an edge of the upper portion of the main frame 130.

In addition, the main frame 130 further includes a supporting portion 135 at adjacent two corners. The supporting portion 135 extends from the corner toward the inside such that a width of the corner of the main frame 130 is larger than other portions of the mainframe 130. Particularly, the supporting portion 135 is formed on a side of the main frame 130 that is opposite to the LED assembly 129.

Since the guide wall 133 is formed at the corner, there normally would not be sufficient area for attaching the light-shielding tape 160. In order to securely attach the light-shielding tape 160 at the corner of the main frame 130, the supporting portion 135 is formed as a part of the mainframe 130. Namely, an area at the upper portion of the corner of the main frame 130 is increased such that the light-shielding tape 160 can be securely attached. The supporting portion 135 may have substantially the same area as the guide wall in a plane view.

To block the light directed to the liquid crystal panel 110 from the LED assembly 129, the width of the light-shielding tape 160 and the main frame 130 may be larger at the side of the LED assembly 129 than the other sides. Namely, sufficient area for attaching the light-shielding tape 160 is provided at the side of the LED assembly 129. Accordingly, the supporting portion 135 is formed at the opposite side of the LED assembly 129. Alternatively, each of the light-shielding tape 160 and the main frame 130 may have the same width at the four sides, and the supporting portion 135 may be formed at all corners of the main frame 130.

A shape of the light guide plate 123, which is surrounded by the main frame 130, and a shape of the light-shielding tape 160, which is attached on the main frame 130, are modified according to the above configuration of the main frame 130.

In more detail, two corners of the light guide plate 123, which correspond to the supporting portions 135, are cut such that the light guide plate 123 has a first chamfer portion 123a at the two corners. In addition, two corners of the light-shielding tape 160, which correspond to the guide walls 133, are cut such that the light-shielding tape 160 has a second chamfer portion 161 at the two corners.

Thus, the present invention can provide a smaller width for the main frame 130 so that the LCD device can have a narrower bezel. In addition, since the main frame 130 includes the guide wall 133, misalignment of the light-shielding tape 160 is prevented. As a result, the problem in that the light-shielding tape is exposed beyond the main frame and the display area of the liquid crystal panel is shielded by the light-shielding tape can be prevented. Moreover, since the main frame 130 includes the supporting portion 135, there is sufficient area for securely attaching the light-shielding tape 160.

The main frame 130 and the backlight unit 120 are disposed on and over the bottom frame 150. The bottom frame 150 includes a bottom surface 151 and a side surface 153 perpendicularly extending from the bottom surface 151.

As mentioned above, the main frame 130, the top frame 140 and the bottom frame 150 are combined with the liquid crystal panel 110 and the backlight unit 120 therein. The top frame 140 may be referred to as a case top, a top case or a top cover, and the main frame 130 may be referred to as a guide panel, a main support or a mold frame. The bottom frame 150 may be referred to a bottom cover.

The top frame 140 and/or the bottom frame 150 may be produced such that the LCD device has further advantages in the weight, thickness, process yields and production costs.

Figure 3:
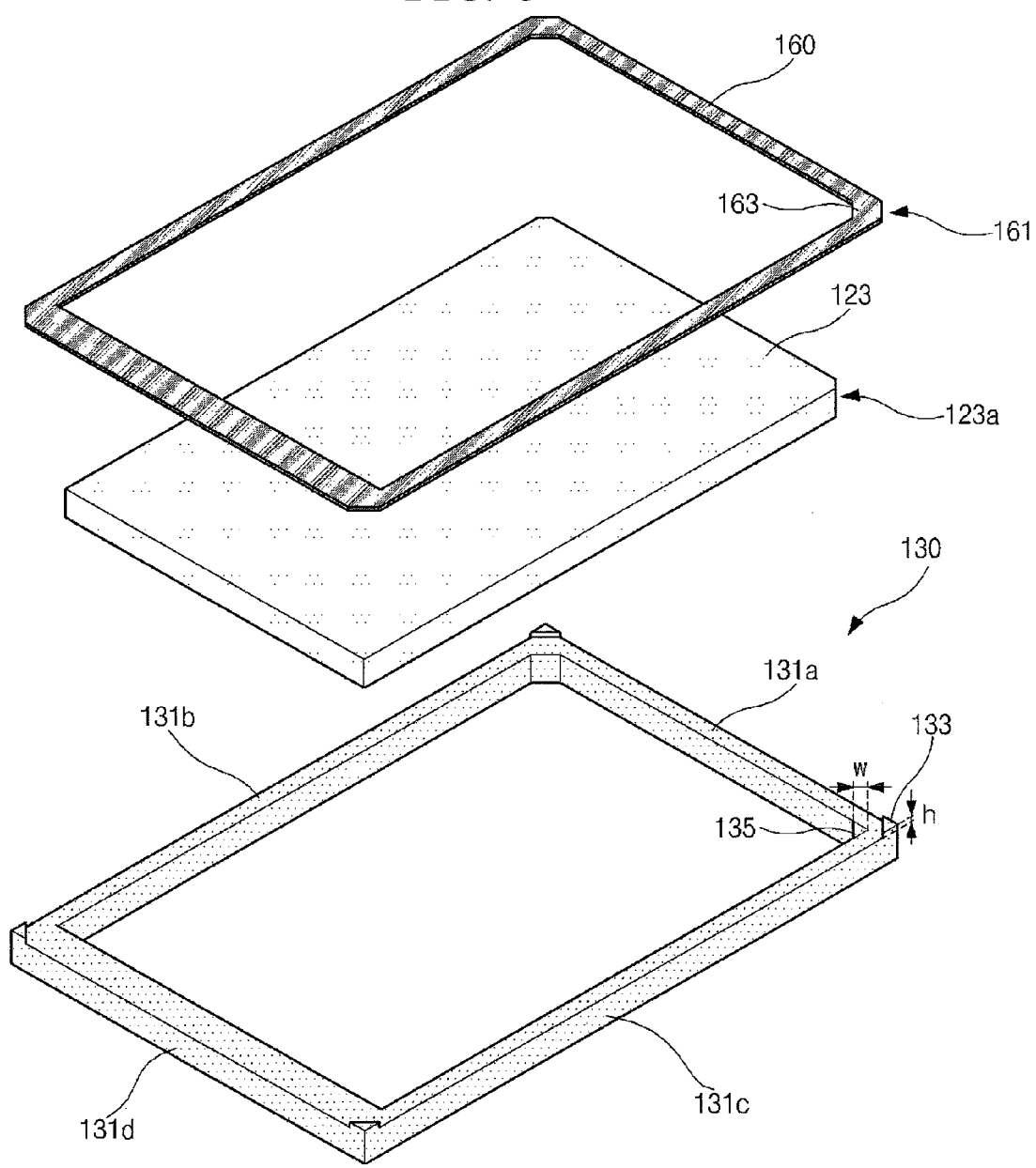
FIG. 3 is a schematic view showing a main frame, a light guide plate and a light-shielding tape according to an embodiment of the invention.
Figure 4B:
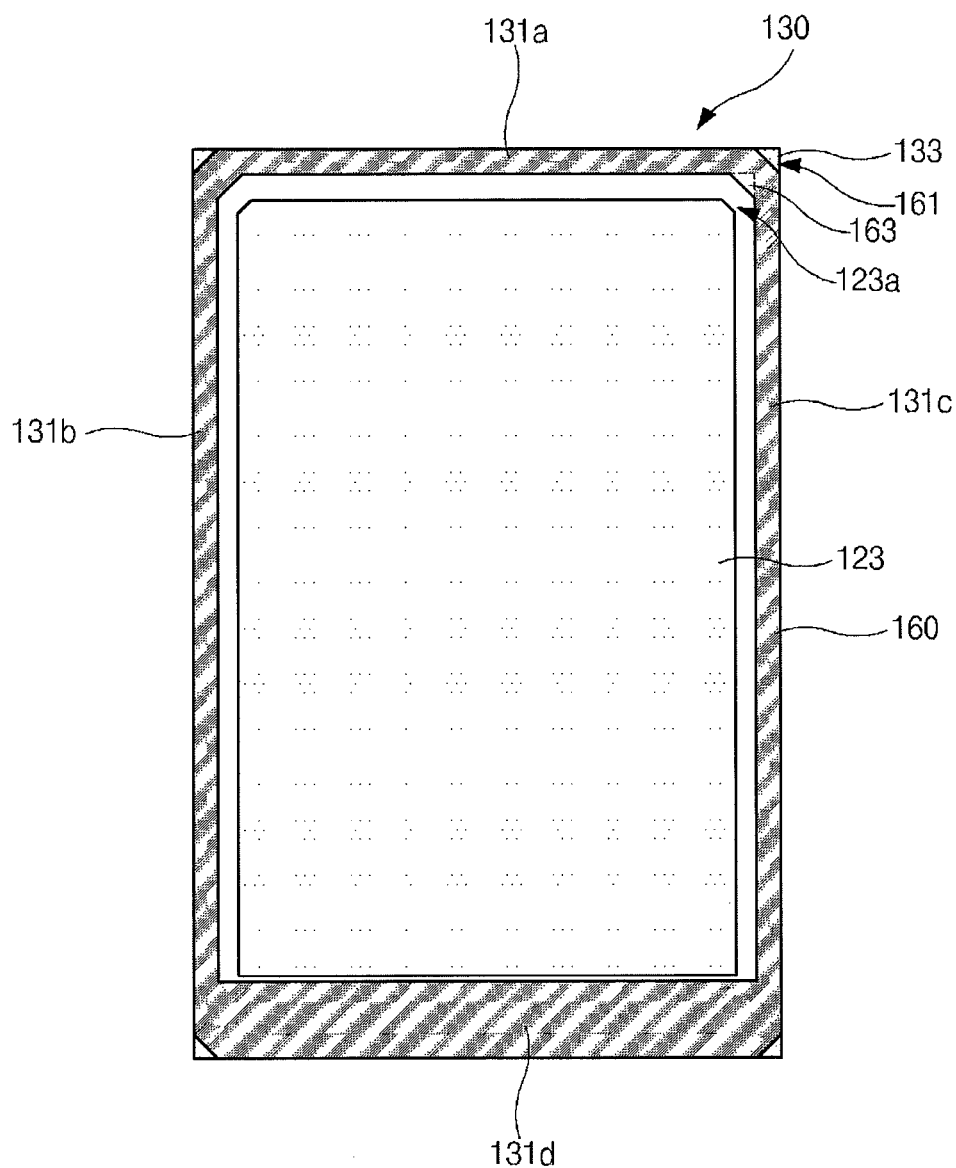
Figure 4C:
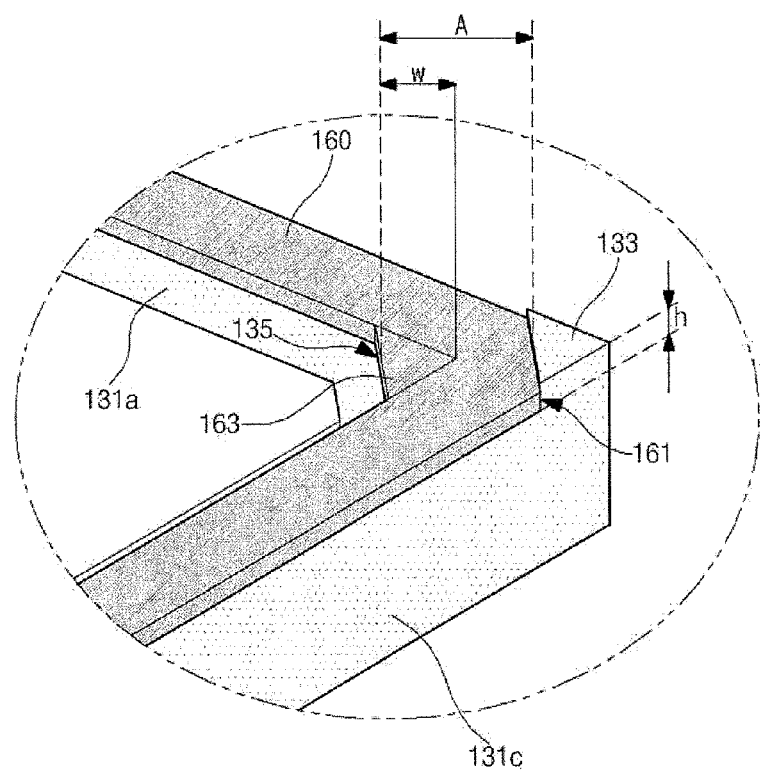

FIG. 3 is a schematic view showing a main frame, a light guide plate and a light-shielding tape, and FIGS. 4A to 4C are views illustrating a modularization structure of a main frame, a light guide plate and a light-shielding tape. FIG. 4C is an enlarged view of a corner part in FIG. 4B.

The main frame 130 surrounds a side of the backlight unit 120 (of FIG. 2) and supports the liquid crystal panel 110 (of FIG. 2).

As shown in FIG. 3, the main frame 130 includes first to fourth side walls 131a, 131b, 131c and 131d providing a rectangular ring shape or a loop shape. The fourth side wall 131d at the side of the LED assembly 129 (of FIG. 2) has a width that is larger than the first to third side walls 131a, 131b and 131c, in order to block light to the liquid crystal panel 110 from the LED assembly 129.

The light-shielding tape 160 is attached on the upper surface of the first to fourth side walls 131a to 131d, and the edges of the liquid crystal panel 110 are disposed on the light-shielding tape 160.

In each corner of the main frame 130, the guide wall 133 is formed. Namely, the guide wall 133 protrudes from the upper surface of the main frame 130 at contact portions of the first to fourth side walls 131a to 131d. For example, the guide wall 133 may have a triangular prism shape and may have a height "h". The height "h" of the guide wall 133 may be substantially equal to or larger than a thickness of the light-shielding tape 160. There is no limitation for a width of the guide wall 133 as long as there is sufficient area on the main frame 130 for supporting the liquid crystal panel 110.

At the two corners of the main frame 130 at the opposite side of the LED assembly 129, the supporting portion 135 is formed. Namely, the supporting portion 135 is formed at crossing portions between the first side wall 131a and each of the second and third side walls 131b and 131c. The supporting portion 135 protrudes from the two corners into an inner space of the main frame 130. Namely, the supporting portion 135 extends from the main frame 130 toward the backlight unit 120. The supporting portion 135 horizontally extends from the upper surface of the main frame 130 such that the supporting portion 135 and the upper surface of the main frame 130 form a flat top surface except for the guide wall 133, which protrudes from the main frame 130. The guide wall 133 is positioned at an outer corner, while the supporting portion 135 is positioned at an inner corner.

The main frame 130 includes the guide wall 133 for guiding a position of the light-shielding tape 160 and the supporting portion 135 for increasing an adhesion area between the light-shielding tape 160 and the main frame 130.

The light guide plate 123 includes the first chamfer portion 123a at adjacent two corners. The first chamfer portion 123a corresponds to the supporting portion 135 of the main frame 130. Namely, adjacent two corners of the light guide plate 123 are cut to form the first chamfer portion 123a. Since the main frame 130 includes the supporting portion 135, which protrudes from the two corners into an inner space of the main frame 130, the corners of the light guide plate 123 may crash into the supporting portion 135 such that the light guide plate 123 or the supporting portion 135 is damaged. To prevent the problem, the light guide plate 123 includes the first chamfer portion 123a.

In more detail, as shown in FIG. 4A, the main frame 130 surrounds the light guide plate 123 such that the light guide plate 123 is disposed at an inner space of the main frame 130. When the light guide plate 123 has a rectangular shape without the first chamfer portion 123a, the corner of the light guide plate 123 can crash into the supporting portion 135 protruding from the corner of the main frame 130. However, in the present invention, the above problem is avoided because of the first chamfer portion 123a.

In addition, the light-shielding tape 160, which is attached on the first to fourth side walls 131a to 131d of the main frame 130, includes the second chamfer portion 161. Namely, four corners of the light-shielding tape 160 are cut to form the second chamfer portion 161. In more detail, as shown in FIG. 4B, due to the second chamfer portion 161, the light-shielding tape 160 is guided into an inner side of the guide walls 133 of the main frame 130. As a result, the light-shielding tape 160 is attached in a desired position.

Moreover, the light-shielding tape 160 includes a protrusion 163 at adjacent two corners. The protrusion 163 of the light-shielding tape 160 corresponds to (e.g., aligns on top of) the supporting portion 135 of the main frame 130. In more detail, as shown in FIG. 4C, since the protrusion 163 having substantially the same width "W" as the supporting portion 135 of the main frame 130 is formed at the two corners of the light-shielding tape 160, there is sufficient area "A" for attaching the light-shielding tape 160 onto the main frame 130 even though the guide wall 133 is formed at the corner.

In the present invention, a width of the main frame 130 is decreased to obtain the narrow bezel LCD device. The main frame 130 includes the guide wall 133 for guiding the light-shielding tape 160 such that the light-shielding tape 160 is attached with the desired position. Accordingly, the problems in that the light-shielding tape is exposed beyond the main frame and/or the display area of the liquid crystal panel is shielded by the light-shielding tape can be prevented.

In addition, since the main frame 130 and the light-shielding tape 160 respectively include the supporting portion 135 and the protrusion 163, there is the sufficient area for attaching the light-shielding tape 160 such that the light-shielding tape 160 is securely attached on the main frame 130.

Moreover, since the light-guide plate 123 includes the first chamfer portion 123a, crashing problems between the light-guide plate 123 and the supporting portion 135 can be prevented.

Furthermore, since the light-shielding tape 160 includes the second chamfer portion 161, the light-shielding tape 160 is securely guided in the inner side of the guide walls 133.

Figure 5:
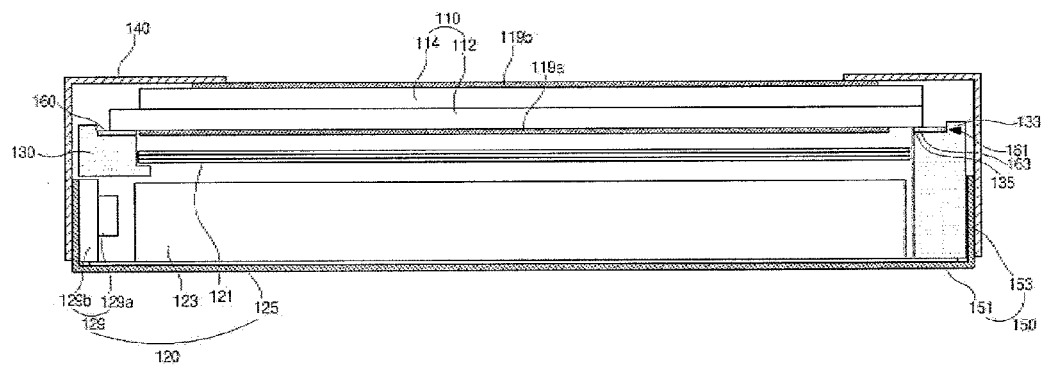
FIG. 5 is a cross-sectional view of the LCD device according to the first embodiment of the present invention.

Referring to FIG. 5, which is a cross-sectional view of the LCD device according to the first embodiment of the present invention, the cross-sectional view of the LCD device will be explained.

As shown in FIG. 5, the liquid crystal panel 110, which includes the first and second substrates 112 and 114 with a liquid crystal layer therebetween, and the backlight unit 120, which is disposed under the liquid crystal panel 110 and provides light to the liquid crystal panel 110, are modularized by the main frame 130, the top frame 140 and the bottom frame 150.

The backlight unit 120 includes the reflective sheet 125, the light guide plate 123, the LED assembly 123 and the optical sheet 121. The first and second polarizing plates 119a and 119b are positioned on outer sides of the first and second substrates 112 and 114.

On the upper surface of the main frame 130, the guide wall 133 is formed. The light-shielding tape 160 is attached in the inner side of the guide wall 133 and on the main frame 130 such that light leakage is prevented. In addition, the supporting portion 135 is formed on the main frame 130, and the light-shielding tape 160 is securely attached on the main frame 130.

The back edges of the liquid crystal panel 110 are attached on and supported by the light-shielding tape 160.

In the present invention, a width of the main frame 130 is decreased to obtain a narrow bezel LCD device. The main frame 130 includes the guide wall 133 for guiding the light-shielding tape 160 such that the light-shielding tape 160 is attached at the desired position. Accordingly, the problems in that the light-shielding tape is exposed beyond the main frame and/or the display area of the liquid crystal panel being shielded by the light-shielding tape can be prevented.

In addition, since the main frame 130 and the light-shielding tape 160 respectively include the supporting portion 135 and the protrusion 163, there is the sufficient area for attaching the light-shielding tape 160 such that the light-shielding tape 160 is securely attached on the main frame 130.

Moreover, since the light-guide plate 123 includes the first chamfer portion 123a, crashing problems between the light-guide plate 123 and the supporting portion 135 can be prevented.

Furthermore, since the light-shielding tape 160 includes the second chamfer portion 161, the light-shielding tape 160 is securely guided in the inner side of the guide walls 133.

Figure 6:
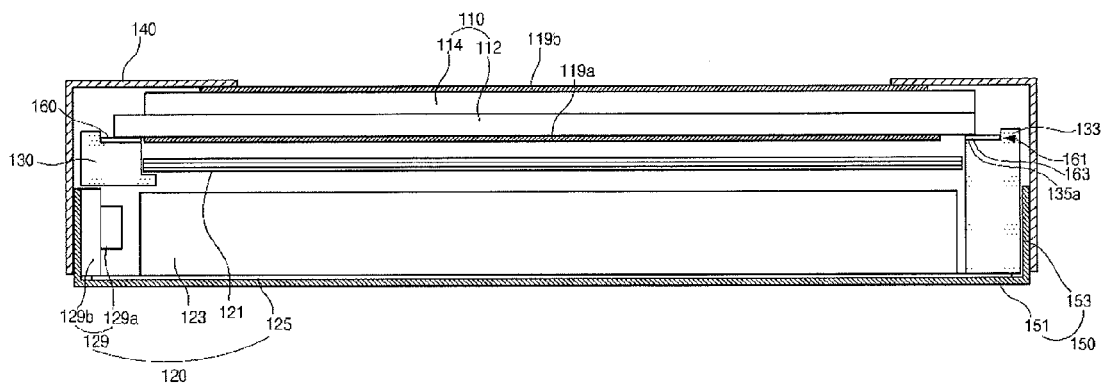
FIG. 6 is a cross-sectional view of an LCD device according to a second embodiment of the present invention.

FIG. 6 is a cross-sectional view of an LCD device according to a second embodiment of the present invention.

The LCD device according to the second embodiment of the present invention further has advantages in the weight and thickness by omitting or eliminating the top frame 140 (of FIG. 5) and the bottom frame 150 (of FIG. 5). The explanation is focused on a difference from the first embodiment.

As shown in FIG. 6, the backlight unit 120 includes the reflective sheet 125, the light guide plate 123, and the LED assembly 123, which includes the LEDs 129a and the PCB 129b, and the optical sheet 121.

The liquid crystal panel 110, which includes the first and second substrates 112 and 114 with a liquid crystal layer therebetween, is disposed over the backlight unit 120. The first and second polarizing plates 119a and 119b are positioned on outer sides of the first and second substrates 112 and 114.

The main frame 130 includes a first guide wall 133 on the upper surface for guiding the light-shielding tape 160. Similar to the supporting portion 135 (of FIG. 3) in the first embodiment, a first supporting portion 135a is formed on the main frame 130.

The back edges of the liquid crystal panel 110 are disposed on and supported by the light-shielding tape 160. The light-shielding tape 160 has an adhesive property such that the liquid crystal panel 110 is attached on and fixed by the light-shielding tape 160.

The main frame 130 further includes a second guide wall 133b and a second supporting portion 135b on a lower surface. Namely, the second guide wall 133b protrudes from each corner of the main frame, and the second supporting portion 135b extends toward the inner side of the main frame 130. The second supporting portion 135b has a width substantially same as the second guide wall 133b such that there is sufficient area for attaching the reflective sheet 125 to the lower surface of the main frame 130. The second supporting portion 135b horizontally extends from the lower surface of the main frame 130 such that the second supporting portion 135b and the lower surface form a flat top surface except for the second guide wall 133b, which protrudes from the main frame 130.

The reflective sheet 125 is attached on the lower surface of the main frame 130. The corners of the reflective sheet 125 are cut such that a third chamfer portion 125a is formed. The reflective sheet 125 is guided by the second guide wall 133b for attaching the reflective sheet 125 in the desired position.

In the present invention, a width of the main frame 130 is decreased to obtain a narrow bezel LCD device. The main frame 130 includes the first guide wall 133a for guiding the light-shielding tape 160 such that the light-shielding tape 160 is attached at the desired position. Accordingly, the problems in that the light-shielding tape is exposed beyond the main frame and/or the display area of the liquid crystal panel is shielded by the light-shielding tape can be prevented.

In addition, since the main frame 130 and the light-shielding tape 160 respectively include the first supporting portion 135a and the protrusion 163, there is sufficient area for attaching the light-shielding tape 160 such that the light-shielding tape 160 is securely attached on the main frame 130. Since the light-guide plate 123 includes the first chamfer portion 123a, crashing problems between the light-guide plate 123 and the first supporting portion 135a can be prevented.

Moreover, since the light-shielding tape 160 includes the second chamfer portion 161, the light-shielding tape 160 is securely guided into the inner side of the first guide walls 133a.

Furthermore, since the main frame 130 further includes the second guide wall 133b and the second supporting portion 135b, the reflective sheet 125 is securely attached on and fixed to the lower surface of the main frame 130 without the bottom frame 150 (of FIG. 5). As a result, the weight and the thickness of the LCD device are further reduced.

It will be apparent to those skilled in the art that various modifications and variations can be made in the exemplary embodiments of the present invention without departing from the spirit or scope of the invention. Thus, it is intended that the invention covers modifications and variations of this invention provided they come within the scope of the appended claims and their equivalents.

What is claimed is:

1. A liquid crystal display device, comprising:
a backlight unit disposed under a liquid crystal panel, and including a light guide plate and a light source at a first side of the light guide plate;
a main frame surrounding the backlight unit and including a first guide wall and a first supporting portion, the first guide wall protruding from each corner of an upper surface of the main frame, and the first supporting portion extending from adjacent two corners of the upper surface in the first side toward the backlight unit;
a light-shielding tape attached on the upper surface of the main frame by being guided by the first guide wall of the main frame and including a first chamfer portion at each corner and a protrusion at adjacent two corners in the first side of the light guide plate, wherein the first chamfer portion and the protrusion correspond to the first guide wall and the first supporting portion, respectively; and
the liquid crystal panel disposed over the backlight unit and attached on the light-shielding tape.

2. The device according to claim 1, wherein the light guide plate includes a second chamfer portion corresponding to the first supporting portion.

3. The device according to claim 1, wherein the main frame has first to fourth side walls, and the first supporting portion is formed at crossing portions between the first side wall at the first side of the light guide plate and each of the second and third side walls.

4. The device according to claim 1, wherein a height of the first guide wall is equal to or larger than a thickness of the light-shielding tape.

5. The device according to claim 1, wherein the first supporting portion of the main frame has the same width as the first guide wall of the main frame.

6. The device according to claim 1, wherein the main frame further includes a second guide wall protruding from each corner of a lower surface of the main frame and a second supporting portion extending from adjacent two corners of the lower surface toward the backlight unit.

7. The device according to claim 6, wherein the backlight unit further includes a reflective sheet including a third chamfer portion, and the third chamfer portion corresponds to the second guide wall, and wherein the reflective sheet is attached on and fixed to the lower surface of the main frame without a bottom frame.

8. The device according to claim 7, wherein the second supporting portion of the main frame has the same width as the second guide wall of the main frame.

9. The device according to claim 6, wherein the second supporting portion of the main frame horizontally extends from the lower surface of the main frame such that the second supporting portion and the lower surface form a flat top surface except for the second guide wall.

10. The device according to claim 1, wherein the first supporting portion of the main frame horizontally extends from the upper surface of the main frame such that the first supporting portion and the upper surface form a flat top surface except for the first guide wall.

11. A main frame structure for a display device, the structure comprising:
a main frame configured to surround a backlight unit of the display device, and including a first guide wall and a first supporting portion, the first guide wall protruding from each corner of an upper surface of the main frame, and the first supporting portion extending from adjacent two corners of the upper surface of the main frame; and
a light-shielding tape positioned on the upper surface of the main frame by being guided by the first guide wall of the main frame, and including a first chamfer portion at each corner and a protrusion at adjacent two corners of the light-shielding tape, wherein the first chamfer portion and the protrusion correspond to the first guide wall and the first supporting portion, respectively.

12. The main frame structure according to claim 11, wherein the main frame has first to fourth side walls, and the first supporting portion is formed at crossing portions between the first side wall and each of the second and third side walls.

13. The main frame structure according to claim 11, wherein the first supporting portion of the main frame has the same width as the first guide wall of the main frame.

14. The main frame structure according to claim 11, wherein the main frame further includes a second guide wall protruding from each corner of a lower surface of the main frame and a second supporting portion extending from adjacent two corners of the lower surface of the main frame.

15. The main frame structure according to claim 14, wherein the second supporting portion of the main frame has the same width as the second guide wall of the main frame.

16. The main frame structure according to claim 14, wherein the second supporting portion of the main frame horizontally extends from the lower surface of the main frame such that the second supporting portion and the lower surface form a flat surface except for the second guide wall.

17. The main frame structure according to claim 11, wherein the first supporting portion of the main frame horizontally extends from the upper surface of the main frame such that the first supporting portion and the upper surface form a flat top surface except for the first guide wall.

* * * * *